United States Patent [19]
Chrisco

[11] Patent Number: 5,943,981
[45] Date of Patent: Aug. 31, 1999

[54] BIRD HOUSE ASSEMBLY

[75] Inventor: Larry L. Chrisco, Fairland, Okla.

[73] Assignee: Blitz U.S.A., Inc., Miami, Okla.

[21] Appl. No.: 08/950,487

[22] Filed: Oct. 15, 1997

[51] Int. Cl.$^6$ ................................................. A01K 31/00
[52] U.S. Cl. .......................................... 119/428; 119/431
[58] Field of Search .................................... 119/428, 431, 119/432, 433, 434, 435

[56] References Cited

U.S. PATENT DOCUMENTS

| | | | |
|---|---|---|---|
| 3,135,239 | 6/1964 | Bartolotta | 119/431 |
| 3,410,248 | 11/1968 | Vail | 119/434 |
| 3,496,913 | 2/1970 | Vail | 119/432 |
| 3,792,685 | 2/1974 | Wiener | 119/428 |
| 3,804,066 | 4/1974 | Lowe | 119/431 |
| 4,928,631 | 5/1990 | Smith | 119/428 |
| 5,186,123 | 2/1993 | Cuddy | 119/434 |

*Primary Examiner*—Robert P. Swiatek
*Assistant Examiner*—Elizabeth Shaw

*Attorney, Agent, or Firm*—Hovey, Williams, Timmons & Collins

[57] ABSTRACT

A bird house assembly (10) includes a housing (12) defining a bird-nesting enclosure (13) therein. The housing (12) includes at least one deck wall (18) and sidewall (24, 26). An access hole (124) is defined in housing (12) for permitting ingress to and egress from the enclosure (13) by a bird. The sidewall (24) is preferably connected to the deck wall (18) using at least one locking connection tongue (98) depending from each sidewall (24) and configured for receipt within a corresponding tongue-receiving slot (54) defined in the deck wall (18). The housing (12) is coupled with a support member (16) in order to suspend the housing (12) above the ground. For such purposes, a pair of clamp assemblies (14) are preferably used and are configured for coupling with the support member (16) in a spaced relationship for engaging and holding the housing (12) therebetween. In preferred forms, the housing (12) includes an additional deck wall (20) and structure (28, 30) for defining a plurality of multi-story, bird-nesting compartments (32) within the enclosure (13).

22 Claims, 3 Drawing Sheets

BIRD HOUSE ASSEMBLY

RELATED APPLICATIONS

Not applicable.

FEDERALLY SPONSORED RESEARCH OR DEVELOPMENT

Not applicable.

MICROFICHE APPENDIX

Not applicable.

BACKGROUND OF THE INVENTION

1. Field of the Invention

The present invention relates to a bird house assembly. In particular, the invention pertains to such an assembly including a housing having a sidewall connected with a deck wall. The housing is configured for coupling with a support member for suspension above a support surface and includes a locking connection tongue for connecting the sidewall to the deck wall.

2. Description of the Prior Art

Birds are usually welcomed guests at a person's property. Their calls to each other provide entertainment and their colors and markings can be pleasing to the eye. More importantly, birds typically consume insect pests, which facilitates insect-free entertaining outdoors and prevents the spread of disease by insect carriers.

For such reasons, bird houses are often constructed and placed in such a manner to attract birds to a property for nesting purposes. For example, it is a popular practice in North America to erect apartment-style nesting boxes to attract the purple martin (classified as *Progne subis*). The purple martin is known for its ability to feed on the wing and consume vast quantities of insects. Being a gregarious and highly colonial species of bird, the purple martin is instinctively lured to manmade, multi-compartmented structures, which are accepted in lieu of tree cavities, their natural nesting sites.

The prior art discloses a variety of multi-compartmented housing structures for accommodating the purple martin and other species of birds. The bird houses of the prior art are typically constructed of wood or a light metal (e.g., aluminum) and can involve complicated and time-consuming assembly in order to place the finished structure in service. Such bird houses are often very expensive and may require periodic painting and other maintenance to maintain the attractive appearance of the bird house.

SUMMARY OF THE INVENTION

The problems outlined above are in large measure solved by the bird house assembly in accordance with the present invention. That is to say, the assembly hereof is specially designed to be easily and quickly assembled and is a cost-effective means for providing naturally attractive and suitable accommodations for purple martins and other birds. Preferably, the assembly is composed of ultraviolet-resistant synthetic resin materials, which will insure that the housing structure is sufficiently protected against the elements and will eliminate the need to periodically paint the structure or perform other similar maintenance.

The bird house assembly of the present invention broadly includes a housing defining a bird-nesting enclosure and having a root a plurality of sidewalls and a bottom floor. The housing is coupled with a support member to suspend the housing above the ground. For such purposes, a pair of clamp assemblies are configured for coupling with the support member in a spaced relationship adjacent the roof and floor, respectively, for engaging and holding the housing therebetween.

In preferred forms, the housing includes a plurality of divider walls and an additional floor in order to define a plurality of multi-story bird-nesting compartments within the enclosure. Each compartment has an access hole positioned for permitting ingress and egress to and from the compartment by a bird.

The sidewalls are preferably connected to the bottom and upper floors using a connection tongue configured for receipt within a corresponding tongue-receiving slot defined in each floor. Each connection tongue depends from the bottom edge of the sidewall and includes a locking tab for locking the tongue in place within the slot.

DETAILED DESCRIPTION OF THE PREFERRED EMBODIMENT

Figure 1:
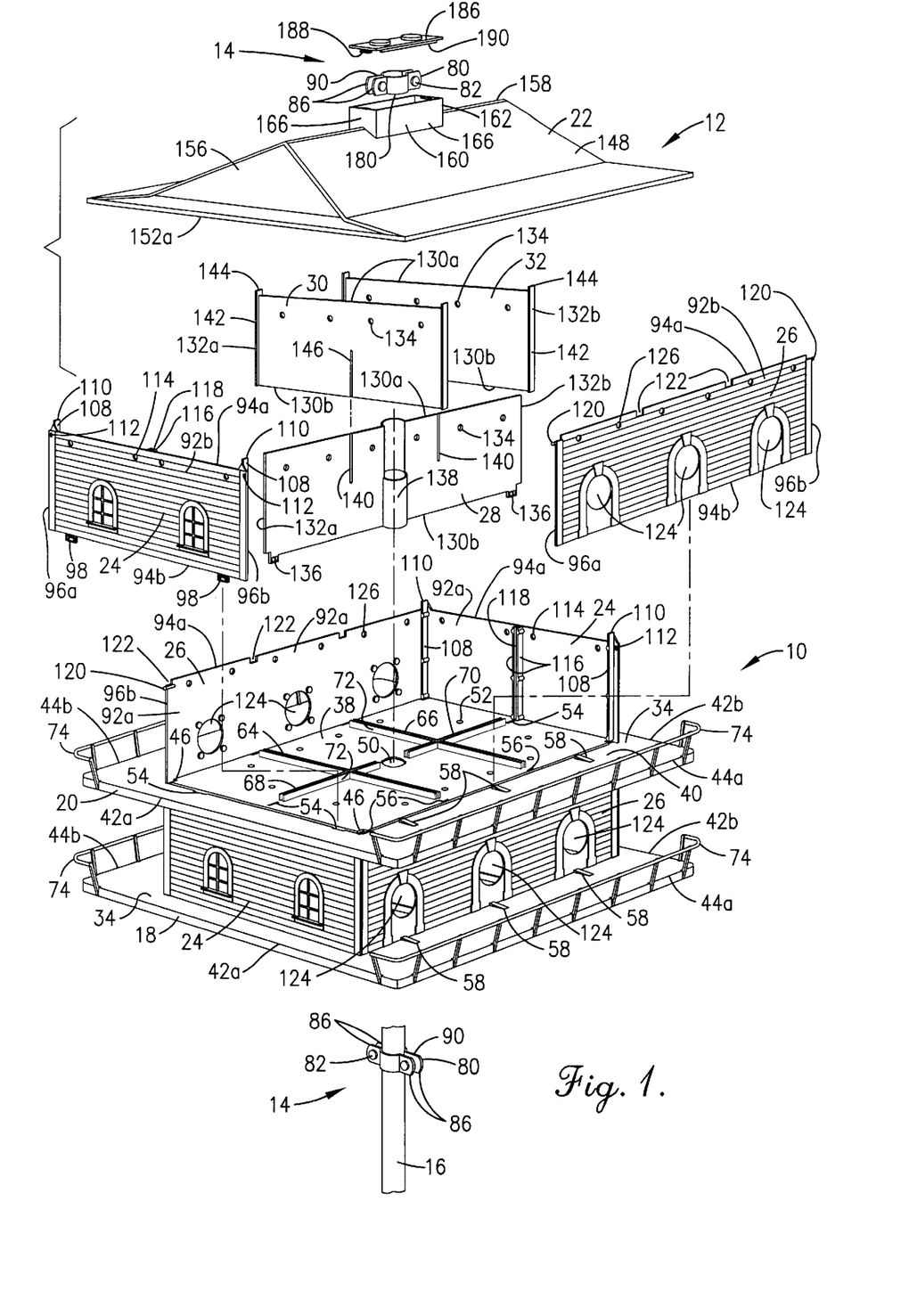
FIG. 1 is an exploded pictorial view of the preferred bird house assembly in accordance with the present invention.

Referring to the drawing figures, and in particular to FIG. 1, a preferred bird house assembly 10 in accordance with the present invention is illustrated in a partially assembled condition. Broadly, assembly includes a housing 12 defining a bird-nesting enclosure 13 therein and a pair of clamp assemblies 14 configured for coupling with a support member 16 to suspend housing 12 above the ground or other surface (not shown). Housing 12 includes a bottom floor 18, an upper floor 20 (essentially identical in all respects to bottom floor 18), a roof 22, opposed upper and bottom floor, generally rectangular, locking sidewalls 24, and opposed upper and bottom floor, generally rectangular, pivoting sidewalls 26. Preferably, housing 12 includes upper and bottom floor, generally rectangular locking divider walls 28 and non-locking divider walls 30 for defining six bird-nesting compartments 32 on each floor 18, 20.

Each locking and pivoting sidewall 24, 26 is similar in all respects to an opposed sidewall installed on each floor 18, 20. In addition, the set of sidewalls 24, 26 and divider walls 28, 30 installed on bottom floor 18 are similar in all respects to the corresponding set of sidewalls and divider walls installed on upper floor 20. Accordingly, for the sake of brevity, single reference numerals shall be used to designate each type of sidewall and divider wall for both bottom and upper floors.

In more detail, each floor 18, 20 includes generally rectangular, opposed upper and lower faces 34, 36. Upper face 34 presents a generally rectangular, slightly raised upper deck portion 38 and a generally rectangular, lower deck portion 40 continuously circumscribing upper deck portion 38. Upper deck portion and lower deck portion each respectively presents opposed side edges 42a, 42b and opposed bird access edges 44a, 44b. Upper deck portion has four non-locking tongue-receiving corner notches 46 adjacent each respective corner thereof A plurality of spaced joists 48 run in both directions across (i.e., parallel with side edges 42 and parallel with access edges 44), depend from and are integrally formed with lower face 36. Two sets of spaced apart, pivoting sidewall-receiving notches (not shown) are defined in joists 48, with each set being aligned parallel with and located on lower face 36 proximal to each respective opposed upper deck portion access edge 44. Floors 18, 20 further include a centrally-located support member-receiving aperture 50 and a plurality of drainage holes 52 extending therethrough.

Three pairs of spaced apart, locking tongue-receiving slots 54 extend through each floor 18, 20 (see FIG. 1, which depicts slots 54 in upper floor 20). Two of said pairs are located on lower deck portion 40, with each such pair being adjacent respective opposed side edges 42 of upper deck portion 38 as shown. Each slot 54 in said two pairs runs generally parallel to side edges 42. The third pair is located on upper deck portion 38 adjacent upper deck portion side edges 42 at a point substantially midway between opposed upper deck portion access edges 44. Each of said slots 54 run generally transverse to side edges 42.

Eight non-locking tongue-receiving slots 56 extend through each floor 18, 20 (see FIG. 1, which fully depicts six of eight slots 56 in upper floor 18). Four slots 56 are each located on lower deck portion 40 within each respective corner notch 46 of upper deck portion 38. The other four slots (made up of two pairs of spaced apart slots 56) are located on upper deck portion 38, with each such pair being adjacent respective opposed access edges 44 of upper deck portion 38 as shown. Each slot 56 runs generally parallel to access edges 44.

Two sets of three spaced apart, wedge-type stop members 58 extend upwardly from lower deck portion 40, each set being located proximal to respective opposed access edges 44 of upper deck portion 38. Each stop member 58 has an upstanding stop surface 60 spaced from each access edge 44 a distance at least greater than the thickness of pivoting sidewall 26. Stop surface 60 and upper deck portion access edge 44 cooperatively define a pivoting sidewall-receiving channel 62 therebetween (see FIG. 4).

Four divider wall-receiving channels 64, 66, 68 and 70 are located on upper deck portion 38 of each floor 18, 20. Each channel 64–70 is defined by a pair of generally parallel and rectangular channel walls 72 integrally formed with and extending upwardly from upper face 34. Two channels 64, 66 run generally parallel to each other on each side of aperture 50, each such channel 64, 66 being respectively located between and spaced from two pairs of non-locking tongue-receiving slots 56. The other two channels 68, 70 run generally in alignment with each other, each such channel 68, 70 being respectively located between and spaced from locking tongue-receiving slot 54 and support member-receiving aperture 50.

Two sets of bird rails 74 are integrally formed with and upwardly extend from lower deck portion 40 of each floor 18, 20, each set being located proximal to respective opposed access edges 44 as shown in FIG. 1. It will be appreciated that each bird rail 74 serves to protect young birds from inadvertently falling from housing 12 and also acts as a partial barrier against predators, such as squirrels, cats and other unwelcomed guests.

Figure 3:
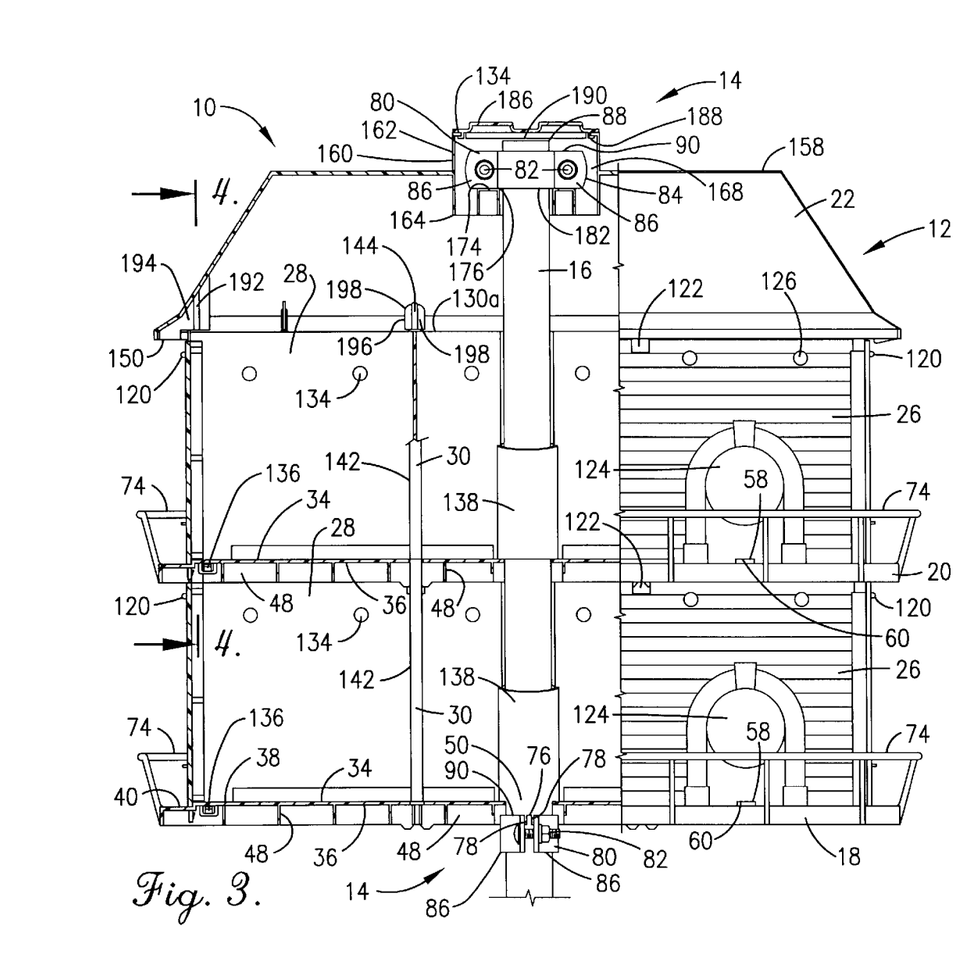
FIG. 3 is a side view of the bird house assembly, with portions broken away to reveal the support member and clamp assemblies.

Each floor 18, 20 further includes a centrally-located clamp-receiving socket 76 integrally formed with lower face 36 and in registry with and adjacent support member-receiving aperture 50 (see FIG. 3). Socket 76 includes two pairs of clamp flange-receiving channels (not shown), each pair being generally in alignment with each other and running adjacent to and on opposite sides of aperture 50. Each pair of channels is defined by two sets of generally parallel and rectangular channel walls depending from lower face (only two inner channel walls 78 are shown).

Each clamp assembly 14 includes a pipe clamp 80 that is configured for coupling with support member 16 (e.g., a pole, pipe or other similar elongated, generally cylindrical structure) in the conventional manner using two nut and bolt sets 82. Each clamp 80 includes two brackets 84 each having a pair of opposed, apertured, outwardly extending side flanges 86. Socket 76 is configured for receiving clamp assembly 14, with each pair of flanges 86 being received in the corresponding pair of flange-receiving channels. When clamp assembly 14 is received within socket 76 in such manner (after clamp assembly 14 has been coupled to support member 16 at point sufficiently spaced from the upper end 88 of support member 16), the top portion 90 of clamp 80 engages and supports lower face 36 of bottom floor 18, and channel walls 78 engage each flange 86 to prevent rotational movement of housing 12 substantially about the longitudinal axis of support member 16.

Each locking and pivotal sidewall 24, 26 presents opposed inside and outside faces 92a and 92b, opposed upper and lower edges 94a and 94b, and opposed side edges 96a and 96b. Each locking sidewall 24 includes two spaced apart locking connection tongues 98 each depending from lower edge 94b proximal to each respective side edge 96. Each tongue 98 is configured for receipt within a corresponding locking tongue-receiving slot 54 defined in lower deck portion 40 of each floor 18, 20 for interconnecting locking sidewalls 24 with floor 18, 20, as illustrated in FIG. 1. A margin 100 circumscribes each slot 54. Each tongue 98 is integrally formed with locking sidewall 24 and includes an apertured frame 102 and an oblique, resilient locking tab 104 extending upwardly from the lower member of frame 102 (see FIG. 4). Each locking tab 104 has a locking surface 106 located at the upper end of tab 104 for engaging lower face 36 of each floor 18, 20 and thereby locking tongue 98 in place when tongue 98 is received within slot 54 (see FIG. 5).

A pair of generally rectangular braces 108 are integrally formed with and extend outwardly from inside face 92a of each locking sidewall 24 proximal to each side edge 96. Each brace 108 runs generally parallel to side edges 96. A non-locking connection tongue 110 is integrally formed with and extends upwardly from each brace 108 relative to upper edge 94a. Each brace 108 is spaced from each side edge 96 a distance at least equal to the thickness of pivoting sidewall 26. The bottom portion of each brace 108 is spaced from lower edge 94b a distance substantially equal to the height of raised upper deck portion 38. It will be appreciated that such horizontal and vertical spacing of brace 108 relative to side and lower edges 96, 94b, respectively, will insure that locking sidewalls 24 are properly joined and flush with each floor 18, 20 and pivoting sidewall 26 when housing 12 is assembled, as discussed in more detail below.

Each locking sidewall 24 further includes a pair of pivot pin-receiving slots 112 each located proximal to the upper corners of sidewall 24 between each respective side edge 96 and brace 108. Four spaced apart ventilation holes 114 extend through each locking sidewall 24 proximal to upper edge 94a in order to maintain a cool nesting environment within enclosure 13. Two spaced, generally parallel and rectangular channel walls 116 are integrally formed with and extend outwardly from inside face 92a. Channel walls 116 run generally parallel to side edges 96 and are located substantially midway between each side edge 96. The bottom portion of each channel wall 116 is spaced from lower edge 94b a distance substantially equal to the height of raised upper deck portion 38. Channel walls 116 cooperatively define a divider wall-receiving channel 118 therebetween.

Each pivoting sidewall 26 includes opposed pivot pins 120 formed integrally with and outwardly extending from side edges 96 proximal to each respective upper corner. Each pivot pin 120 is configured for receipt within the corresponding pin-receiving slot 112 defined in each respective locking sidewall 24 adjacent pivoting sidewall 26. Each pivoting sidewall 26 further includes four spaced apart, brace-receiving notches 122 defined in upper edge 94a of sidewall 26.

Figure 4:
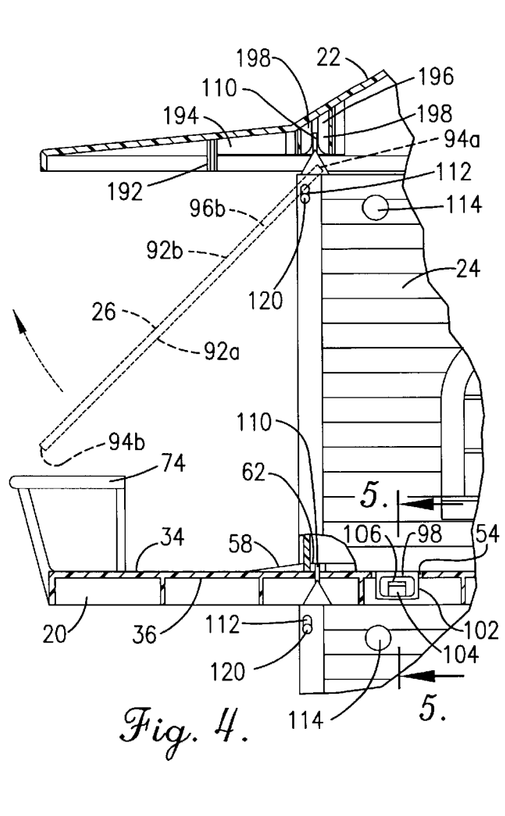
FIG. 4 is a sectional view taken along the line of 4—4 of FIG. 3, which illustrates in phantom one of the sidewalls being pivoted to its opened position.
Figure 5:
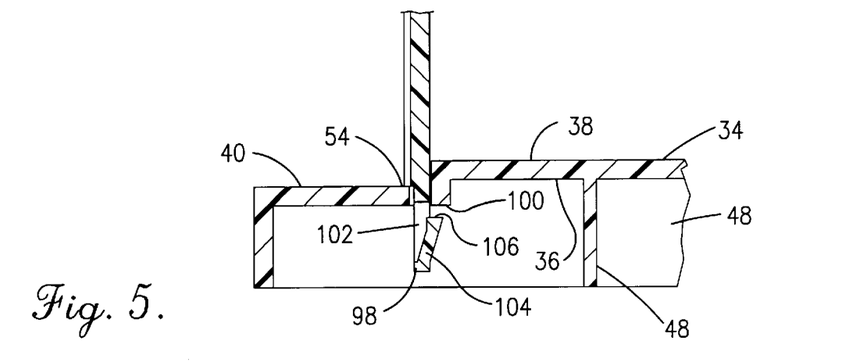
FIG. 5 is a sectional view taken along the line of 5—5 of FIG. 4, which illustrates the sidewall connection tongue locked within the tongue-receiving slot of the upper floor.

As illustrated in FIG. 4, each pivoting sidewall 26 may be pivoted between an opened position (as depicted in phantom) and a closed position. In the closed position thereof, outside face 92b of pivoting sidewall 26 adjacent lower edge 94b engages each stop surface 60, and pivoting sidewall 26 is retained within pivoting sidewall-receiving channel 62. In order to access enclosure 13 for cleaning and other purposes (it being noted that the purple martin and many other species of birds will typically refuse to occupy a previously used nest), pivoting sidewall 26 is lifted upward until lower edge 94b clears each stop member 58. During such upward lifting of sidewall, 26 each pivot pin 120 is correspondingly moved upward within each respective pivot pin-receiving slot 112. It should be noted that the length of slot 112 is slightly greater than the height of stop member 58. Once lower edge 94b clears each stop member 58, pivoting sidewall 26 may then be pivoted outwardly and upwardly as illustrated. To permit such pivoting without interference, each brace-receiving notch 122 receives a portion of each locking sidewall brace 108, and each pivoting sidewall-receiving notch (not shown) receives upper edge 94a of each pivoting sidewall 26.

Three spaced apart bird access holes 124 extend through pivoting sidewall 26. Each access hole 124 is positioned for permitting a bird to enter and exit each corresponding compartment 32. Six spaced apart ventilation holes 126 extend through each pivoting sidewall 26 proximal to upper edge 94a.

Each divider wall 28, 30 presents opposed upper and lower edges 130a and 130b, and opposed side edges 132a and 132b. A plurality of ventilation holes 134 extend through each divider wall 28, 30 proximal to upper edge 130a. Locking divider wall 28 includes two spaced apart, locking connection tongues 136 each depending from lower edge 130b proximal to each respective side edge 132. Each tongue 136 is configured for receipt within the corresponding locking tongue-receiving slots 54 defined in upper deck portion 38 of each floor 18, 20 for interconnecting locking divider wall 28 with floor 18, 20 in essentially the same manner as locking sidewalls 24. Lower edges 130b of locking divider wall 28 are configured for receipt within the corresponding divider wall-receiving channels 68, 70. A support member-receiving guide sleeve 138 is integrally formed with locking divider wall 28. Guide sleeve 138 runs generally parallel to and is located substantially midway between side edges 132. A pair of divider wall-receiving slits 140 are each defined in locking divider wall 28 and run generally parallel to side edges 132. Each slit 140 is located on opposite sides of guide sleeve 128, and extends from upper edge 130a to a point substantially midway between upper and lower edges 130.

Each non-locking divider wall 30 includes a pair of generally rectangular braces 142 integrally formed with each side edge 132. A non-locking connection tongue 144 is integrally formed with and extends upwardly from each brace 142 relative to upper edge 130a. A divider wall-receiving slit 146 is defined in non-locking divider wall 30 and runs generally parallel to side edges 132. Slit 146 is located substantially midway between side edges 132, and extends from lower edge 130b to a point substantially midway between upper and lower edges 130. Slits 140, 146 for locking and non-locking divider walls 28, 30 are configured for matingly connecting with each other in a conventional manner such that locking divider wall 28 may be interconnected with and oriented transversely relative to non-locking divider walls 30 (see FIG. 2, which depicts such transverse orientation in respect of upper floor divider walls 28, 30). Further, upon such interconnection, respective upper edges 130a of each divider wall 28, 30 should be generally coplanar with each other.

Figure 2:
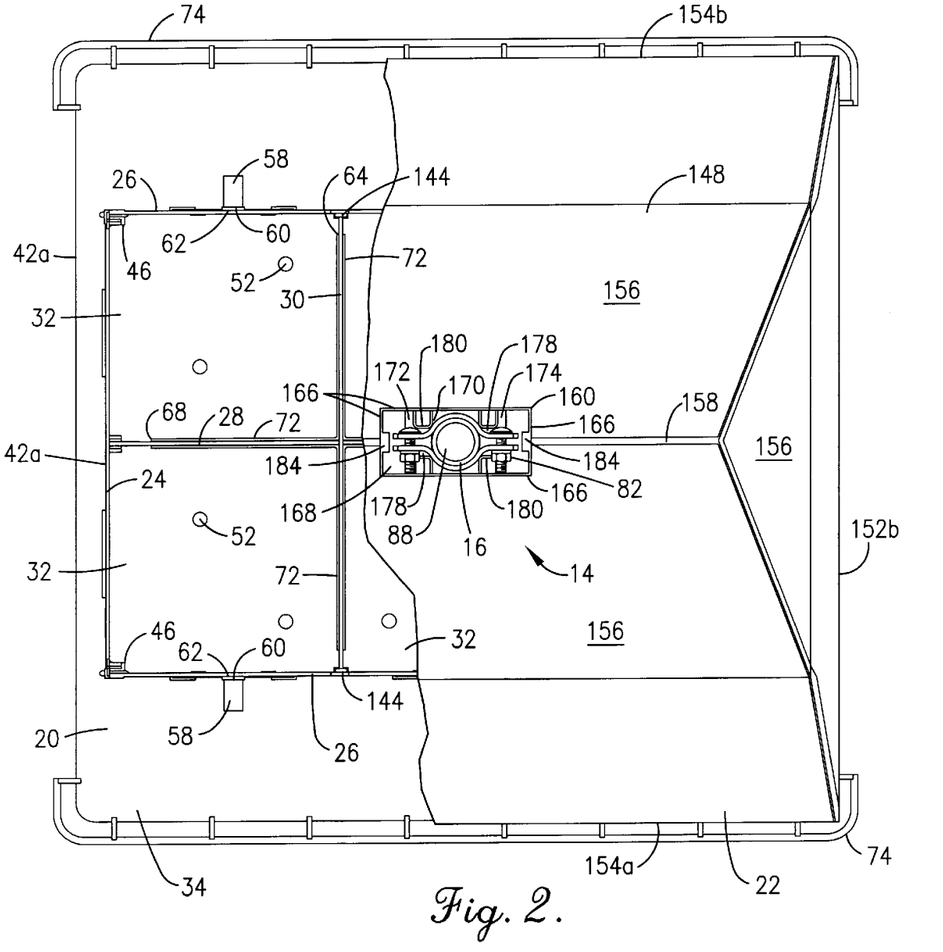
FIG. 2 is a plan view of the bird house assembly of FIG. 1, with the chimney cap removed to reveal the upper clamp assembly and part of the roof broken away to reveal two of the bird-nesting compartments within the enclosure.

Referring to FIGS. 1 and 2, roof 22 presents opposed upper and lower faces 148 and 150, opposed side edges 152a and 152b, and opposed access edges 154a and 154b. Upper face 148 presents a hip roof-type design having four pitched sides 156 and an uppermost ridge 158 running generally parallel to access edges 154. Each side 156 is sufficiently pitched to insure that precipitation adequately drains off of roof 22. It will be appreciated, however, that other forms of roof designs may be employed for such purposes, such as pavilion, lean-to or gable styles of roofs.

A centrally-located, generally rectangular, hollow chimney box 160 extends upwardly from upper face 148 of roof 22. Chimney box 160 includes opposed upper and lower ends 162 and 164 and four sidewalls 166. Sidewalls 166 cooperatively define a clamp-receiving chamber 168 within chimney box 160. Chimney box 160 further includes a centrally-located clamp-receiving socket 170 integrally formed with at least two opposed sidewalls 166 proximal to lower end 164 of box 160. Socket 170 includes a generally rectangular plate member 172 having an upper surface 174 and a centrally-located support member-receiving aperture 176 extending therethrough. Two pairs of clamp flange-receiving channels 178 run across plate member 172, each pair being generally in alignment with each other and running adjacent to and on opposite sides of aperture 176. Each pair of channels 178 is defined by two sets of generally parallel and rectangular channel walls 180 extending upwardly from upper surface 174 of plate member 172.

Socket 170 is configured for receiving clamp assembly 14, with each pair of clamp flanges 86 being received in the corresponding pair of flange-receiving channels 178. When clamp assembly 14 is received within socket 170 in such manner (after clamp assembly 170 has been coupled to support member 16 proximal to upper end 88), the bottom portion 182 of clamp 80 engages upper surface 174 of plate member 172, and channel walls 180 engage each flange 86 to prevent rotational movement of housing 12 substantially about the longitudinal axis of support member 16. Upon engagement of clamp 80 with plate member 172, lower face 150 of roof 22 is maintained in compression against upper edges 94a, 130a of upper floor sidewalls 24, 26 and divider walls 28, 30, as discussed further below.

Chimney box 160 further includes a pair of opposed tabs 184 integrally formed with and extending inwardly into chamber 168 from opposed sidewalls 166 adjacent upper end 162. A generally rectangular chimney cap 186 is configured for covering upper end 112 of chimney box 160 after installation of clamp assembly 14 within chamber 168. Cap 186 includes a pair of resilient, L-shaped catches 188 and a pair of generally rectangular guides (only one guide 190 is shown), each integrally formed with and depending from the lower face of cap 186. Each catch 188 is positioned and configured for snap-fitting in a conventional manner with the corresponding tab 184 for locking cap 186 into place over chimney box 160.

Turning to FIGS. 3 and 4, roof 22 further includes a plurality of spaced purlins 192 and rafters 194 each integrally formed with and depending from lower face 150. Two sets of four, spaced apart, generally cylindrical, non-locking tongue-receiving sockets 196 are also integrally formed with and depend from lower face 150 (only two sockets 196 are shown). Each set is located proximal to and spaced from each respective opposed access edges 154. Each socket 196 includes a pair of opposed, inwardly extending gripping members 198 configured for frictionally engaging and retaining non-locking connection tongues 110, 144 upwardly extending from locking sidewalls 24 and non-locking divider walls 30.

In preferred forms, housing 12 and its components are all integrally formed from ultraviolet-resistant synthetic resin material. Composing the components in such manner insures near maintenance-free use of bird house assembly 10. That is to say, painting and other periodic maintenance will not be necessary. Furthermore, by using synthetic resin material, housing 12 and its components may be easily configured to present the simulated appearance and indicia of various architectural characteristics of a house, such as lap siding, windows, decorative lintels and roof shingles.

The bird house assembly 10 of the present invention is specifically designed for simple and quick assembly as a result of the snap-fit features of sidewalls 24, 26 and divider walls 28, 30 and the adjustable clamping capabilities of clamp assemblies 14. To assemble bird house assembly 10, lower clamp assembly 14 is first coupled with support member 16 in the conventional manner after support member 16 has been previously installed in the ground or other support surface (see FIGS. 1 and 3). Upon coupling, top portion 90 of clamp 80 should be spaced from upper end 88 of support member 16 a distance at least greater than the overall height of housing 12. Upper end 88 of member 16 is then inserted up through support-member receiving aperture 50 adjacent lower face 36 of bottom floor 18 until clamp assembly 14 is received within clamp-receiving socket 76, clamp flanges 86 are received within the corresponding flange-receiving channels (not shown), and top portion 90 of clamp 80 engages and supports lower face 36 of bottom floor 18.

Locking divider wall 28 is next threaded onto support member 16 by inserting upper end 88 of member 16 through support member-receiving guide sleeve 138 adjacent lower edge 130b. Lower edge 130b of locking divider wall 28 is then lowered into the corresponding divider-wall receiving channels 68, 70 of bottom floor 18. At the same time, locking connection tongues 136 of locking divider wall 28 are inserted into the corresponding locking tongue-receiving slots 54 of bottom floor 18. Once each resilient locking tab 104 clears margin 100, locking divider wall 28 is then snap-fitted into place. Any attempt to simply remove locking divider wall 28 by pulling it upward out of channels 68, 70 will result in each locking surface 60 of locking tabs 104 engaging each respective slot margin 100, which thereby prevents such attempted removal.

Two non-locking divider walls 30 are next matingly interconnected with locking divider wall 28 by orienting each non-locking divider wall 30 and locking divider wall 28 transverse to each other, aligning respective divider wall-receiving slits 140, 146, and finally inserting each non-locking divider wall 30 into the corresponding divider wall-receiving channels 64, 66 of bottom floor 18. Once non-locking divider walls 30 are installed on bottom floor 18, each non-locking connection tongue 144 of non-locking divider walls 30 should be extending upward for receipt into the corresponding non-locking tongue-receiving slots 56 in upper floor 20, as detailed below.

Locking connection tongues 98 of each locking sidewall 24 are next inserted into the corresponding locking tongue-receiving slots 54 of bottom floor 18. Each locking sidewall 24 is snap-fitted into place in the same manner as discussed above in respect of locking divider wall 28. Side edges 132 of locking divider wall 28 are then inserted in the corresponding divider wall-receiving channels 118 of locking sidewalls 24. Once locking sidewalls 24 are installed on bottom floor 18, each non-locking connection tongue 110 of locking sidewalls 24 should be extending upward for receipt into the corresponding non-locking tongue-receiving slots 56 in upper floor 20.

Upper floor 20 is next threaded onto support member 16 by inserting upper end 88 through support member-receiving aperture 50 adjacent lower face 36 of upper floor 20. Each non-locking connection tongue 110, 144 of bottom floor locking sidewalls 24 and non-locking divider walls 30 are then inserted into the corresponding non-locking tongue-receiving slots 56 in upper floor 20, which results in joists 48 of upper floor 20 resting on upper edges 94a, 130a of bottom floor sidewalls 24, 26 and divider walls 28, 30. Once upper floor 20 is in place, locking divider wall 28, non-locking divider walls 30 and locking sidewalls 24 are all installed on the upper floor 20 in the same manner as directed above in respect of bottom floor 18.

Roof 22 is next threaded onto support member 16 by inserting upper end 88 through support member-receiving aperture 176 within chimney box 160. Each non-locking connection tongue 110, 144 of upper floor locking sidewalls 24 and non-locking divider walls 30 are then inserted into the corresponding non-locking connection tongue-receiving sockets 196 in lower face 150 of roof 22, which results in purlins 192 and rafters 194 of roof 22 resting on upper edges 94a, 130a of upper floor sidewalls 24, 26 and divider walls 28, 30.

Each pivoting sidewall 26 is next installed by inserting each pivot pin 120 into the corresponding pivot pin-receiving slot 112 of each adjacent locking sidewall 24, and then inserting each lower edge 94b of pivoting sidewall 26 into the corresponding pivoting sidewall-receiving channel 62 in upper face 34 of each floor 18, 20. The somewhat resilient quality of each pivoting sidewall 26 permits the sidewall to be slightly deformed in both directions (i.e., parallel with side edges 96 and parallel with upper and lower edges 94) in order to snap each pivoting sidewall 26 into place.

To complete the assembly, clamp assembly 14 is coupled to support member 16 proximal to upper end 88 thereof. The distance between top portion 90 of clamp 80 and upper end 88 should be less than the depth of chimney box chamber 168, which will permit upper end 88 to be enclosed within chamber 168 when assembly is complete. Clamp assembly 14 (previously coupled to support member 16 adjacent bottom floor 18) is then loosened in order to push both clamp assembly 14 and housing 12 upward until upper surface 174 of plate member 172 within chimney box 160 engages the bottom portion 182 of clamp 80. Once such engagement occurs, assembly is completed by tightening clamp assembly 14 adjacent bottom floor 18 and snap fitting chimney cap 186 into place at upper end of chimney box 160. It should be noted that bird house assembly 10 is maintained in its assembled condition (e.g., roof 22 firmly engaging upper edges 94a, 130a of upper floor sidewalls 24, 26 and divider walls 28, 30) and will remain suspended above the support surface as a result of clamp assemblies tightly engaging and continually holding housing therebetween.

Those skilled in the art will appreciate that the teachings of the bird house assembly hereof may include a variety of embodiments in addition to the preferred embodiment hereinabove described. It is further noted that equivalents may be employed and substitutes made herein without departing from the scope of the invention recited in the claims. For example, the means for connecting the various sidewalls and divider walls with the floors could be accomplished using other structural means, such as slots formed within the walls and configured for connecting with tongues extending from floors, various types of brackets (composed of a separate structure or integrally formed with floors or walls), or additional sets of channels. In addition, the means for coupling housing to support member and maintaining housing in an assembled condition could be accomplished using another form of coupling structure, such as bolts, pins (threaded or nonthreaded) or brackets configured for receipt in one of a plurality of slots or notches defined along the length of support member. In the event of any such substitution or use of equivalents, the size, shape and arrangement of components to the bird house assembly may require appropriate modification.

What is claimed is:

1. A bird house assembly comprising:
    a housing defining a bird-nesting enclosure and including a deck wall and a plurality of sidewalls, said housing including an access hole defined therein for permitting ingress to and egress from said enclosure by a bird;
    a coupler operatively coupling said housing with a support member for suspending said housing above a support surface;
    a connector operatively connecting said sidewall to said deck wall, said connector including a tongue-receiving slot defined in one of said deck wall and said sidewall, and a connection tongue extending from the other of said deck wall and sidewall and configured for receipt within said tongue-receiving slot; and
    said sidewalls each having opposed edges and opposed faces, at least one of said sidewalls being pivotally connected to and disposed between at least two of the other sidewalls for pivotal movement of said one sidewall between an opened position for permitting access to said enclosure and a closed position, said two other sidewalls each having a pivot pin-receiving slot, said one sidewall having opposed outwardly extending pivot pins each proximal one of said edges and configured for slidable receipt within a corresponding one of said pin-receiving slots, said one sidewall having opposed faces, said deck wall having a stop member extending therefrom and configured for engaging one of said opposed faces of said one sidewall face and maintaining said one sidewall in said closed position thereof.

2. The bird house assembly of claim 1, said tongue-receiving slot being defined in said deck wall, said deck wall having opposed faces and a margin circumscribing said tongue-receiving slot, said sidewall having opposed edges, said connection tongue depending from one of said edges and including a resilient locking tab, said tab having a locking surface for engaging said margin upon receipt of said tongue within said tongue-receiving slot for allowing said tab to clear said margin.

3. The bird house assembly of claim 2, said locking tab including a locking surface engageable against one of said deck wall faces for locking said tongue within said tongue-receiving slot when said tongue is received within said tongue-receiving slot.

4. The bird house assembly of claim 1, said coupler including a pair of clamp assemblies for coupling with the support member in a spaced relationship and configured for engaging and holding said housing therebetween.

5. The bird house assembly of claim 1, said housing including structure defining a plurality of bird-nesting compartments within said enclosure, said housing further including a plurality of access holes defined therein, each access hole being positioned for permitting ingress to and egress from a corresponding one of said compartments by the bird.

6. The bird house assembly of claim 5, at least two of said compartments being disposed in a superposed relationship to each other.

7. The bird house assembly of claim 1, said tongue-receiving slot being defined in said deck wall, said deck wall having opposed faces and a margin circumscribing said tongue-receiving slot, said sidewall having opposed edges, said connection tongue depending from one of said edges and including a resilient locking tab, said tab having a locking surface for engaging said margin upon receipt of said tongue within said tongue-receiving slot for allowing said tab to clear said margin, said tab including a locking surface engageable against one of said deck wall faces for locking said tongue within said tongue-receiving slot when said tongue is received within said tongue-receiving slot, said coupler including a pair of clamp assemblies for coupling with the support member in a spaced relationship and configured for engaging and holding said housing therebetween, said housing including structure defining a plurality of bird-nesting compartments within said enclosure, said housing being composed of synthetic resin material and further including a plurality of access holes defined therein, each access hole being positioned for permitting ingress to and egress from a corresponding one of said compartments by the bird.

8. A bird house assembly comprising;
    a housing defining a bird-nesting enclosure and including a deck wall and a sidewall, said housing including an access hole defined therein for permitting ingress to and egress from said enclosure by a bird;
    a connector operatively connecting said sidewall to said deck wall; and
    a coupler operatively coupling said housing with a support member for suspending said housing above a support surface, said coupler including a pair of clamp assemblies for coupling with the support member in a spaced relationship and configured for engaging and holding said housing therebetween;
    said housing including a plurality of sidewalls each having opposed edges and opposed faces, at least one of said sidewalls being pivotally connected to and disposed between at least two of the other sidewalls for pivotal movement of said one sidewall between an opened position for permitting access to said enclosure and a closed position, said two other sidewalls each having a pivot pin-receiving slot, said one sidewall having opposed outwardly extending pivot pins each proximal one of said edges and configured for slidable receipt with a corresponding one of said pin-receiving slots, said deck wall having a stop member extending therefrom and configured for engaging one of said opposed faces of said one sidewall and maintaining said one sidewall in said closed position thereof.

9. The bird house assembly of claim 8, said connector including a tongue-receiving slot defined in one of said deck wall and said sidewall, and a connection tongue extending from the other of said deck wall and sidewall and configured for receipt within said tongue-receiving slot.

10. The bird house assembly of claim 9, said connection tongue being integrally formed with said sidewall.

11. The bird house assembly of claim 8, said housing including a plurality of deck walls, one of said deck walls being a roof, one of the other of said deck walls being a bottom floor, said roof and said bottom floor each having a support member-receiving aperture defined therein, said apertures being in registry with each other, one of said clamp assemblies being configured for coupling with the support member adjacent said roof aperture and engaging said roof, the other of said clamp assemblies being configured for coupling with the support member adjacent said floor aperture and engaging said bottom floor, said connector including a tongue-receiving slot defined in one of said deck wall and said sidewall, and a connection tongue extending from the other of said deck wall and sidewall and configured for receipt within said tongue-receiving slot, said housing including structure defining a plurality of bird-nesting compartments within said enclosure, said housing being composed of synthetic resin materials and further including a plurality of access holes defined therein, each access hole being positioned for permitting ingress to and egress from a corresponding one of said compartments by a bird.

12. A bird house assembly comprising:
a housing defining a bird-nesting enclosure and including a deck wall and a plurality of sidewalls, said housing including an access hole defined therein for permitting ingress to and egress from said enclosure by a bird;
a coupler configured to couple said housing with a support member for suspending said housing above a support surface;
a plurality of connectors configured to connect at least one of said sidewalls to said deck wall; and
said sidewalls each having opposed edges and at least one of said sidewalls being pivotally connected to and disposed between at least two of the other sidewalls for pivotal movement of said one sidewall between an opened position for permitting access to said enclosure and a closed position, said two other sidewalls each having a pivot pin-receiving opening, said one sidewall having pivot pins each proximal one of said edges and configured for receipt within a corresponding one of said pin-receiving openings.

13. The bird house assembly of claim 12, said coupler including a pair of clamp assemblies for coupling with the support member in a spaced relationship and configured for engaging and holding said housing therebetween.

14. The bird house assembly of claim 12, said housing including structure defining a plurality of deck walls, one of said deck walls being a roof, one of the other of said deck walls being a bottom floor.

15. The bird house assembly of claim 12, said one sidewall having opposed faces, said deck wall having a stop member extending therefrom and configured for engaging one of said opposed faces of said one sidewall face and maintaining said one sidewall in said closed position thereof.

16. The bird house assembly of claim 12, said plurality of connectors including a tongue-receiving slot defined in one of said deck wall and said sidewall, and a connection tongue extending from the other of said deck wall and sidewall and configured for receipt with said tongue-receiving slot.

17. The bird house assembly of claim 16, said connection tongue being integrally formed with said sidewall.

18. The bird house assembly of claim 12, said housing being composed of ultraviolet-resistant synthetic resin material.

19. The bird house assembly of claim 12, said housing further including a plurality of access holes defined therein, each access hole being positioned for permitting ingress to and egress from a corresponding one of said compartments by the bird.

20. The bird house assembly of claim 12, said pivot pin-receiving opening being a slot.

21. A bird house assembly comprising:
a housing defining a bird-nesting enclosure and including a deck wall and a plurality of sidewalls, said housing including an access hole defined therein for permitting ingress to and egress from said enclosure by a bird;
a coupler operatively coupling said housing with a support member for suspending said housing above a support surface;
a connector operatively connecting said sidewall to said deck wall, said connector including a tongue-receiving slot defined in one of said deck wall and said sidewall, and a connection tongue extending from the other of said deck wall and sidewall and configured for receipt within said tongue-receiving slot; and
said tongue-receiving slot being defined in said deck wall, said deck wall having opposed faces and a margin circumscribing said tongue-receiving slot, said sidewall having opposed edges, said connection tongue depending from one of said edges and including a resilient locking tab, said tab having a locking surface for engaging said margin upon receipt of said tongue within said tongue-receiving slot for allowing said tab to clear said margin, said tab including a locking surface engageable against one of said deck wall faces for locking said tongue within said tongue-receiving slot when said tongue is received within said tongue-receiving slot, said housing including a plurality of sidewalls, at least one of said sidewalls being pivotally connected to and disposed between at least two of the other sidewalls for pivotal movement of said one sidewall between an opened position for permitting access to said enclosure and a closed position, said coupler including a pair of clamp assemblies for coupling with the support member in a spaced relationship and configured for engaging and holding said housing therebetween, said housing including structure defining a plurality of bird-nesting compartments within said enclosure, said housing being composed of synthetic resin material and further including a plurality of access holes defined therein, each access hold being positioned for permitting ingress to and egress from a corresponding one of said compartments by the bird.

22. A bird house assembly comprising;
a housing defining a bird-nesting enclosure and including a deck wall and a sidewall, said housing including an access hole defined therein for permitting ingress to and egress from said enclosure by a bird;

a connector operatively connecting said sidewall to said deck wall; and a coupler operatively coupling said housing with a support member for suspending said housing above a support surface, said coupler including a pair of clamp assemblies for coupling with the support member in a spaced relationship and configured for engaging and holding said housing therebetween; and said housing including a plurality of deck walls, one of said deck walls being a roof, one of the other of said deck walls being a bottom floor, said roof and said bottom floor each having a support member-receiving aperture defined therein, said apertures being in registry with each other, one of said clamp assemblies being configured for coupling with the support member adjacent said roof aperture and engaging said roof, the other of said clamp assemblies being configured for coupling with the support member adjacent said floor aperture and engaging said bottom floor, said connector including a tongue-receiving slot defined in one of said deck wall and said sidewall, and a connection tongue extending from the other of said deck wall and sidewall and configured for receipt within said tongue-receiving slot, said housing including a plurality of sidewalls, at least one of said sidewalls being pivotally connected to and disposed between at least two of the other sidewalls for pivotal movement of said one sidewall between an opened position for permitting access to said enclosure and a closed position, said housing including structure defining a plurality of bird-nesting compartments within said enclosure, said housing being composed of synthetic resin materials and further including a plurality of access holes defined therein, each access hole being positioned for permitting ingress to and egress from a corresponding one of said compartments by a bird.

\* \* \* \* \*